W. S. MINOR.
EXCELSIOR MACHINE.
APPLICATION FILED MAY 24, 1909.
998,793.
Patented July 25, 1911.
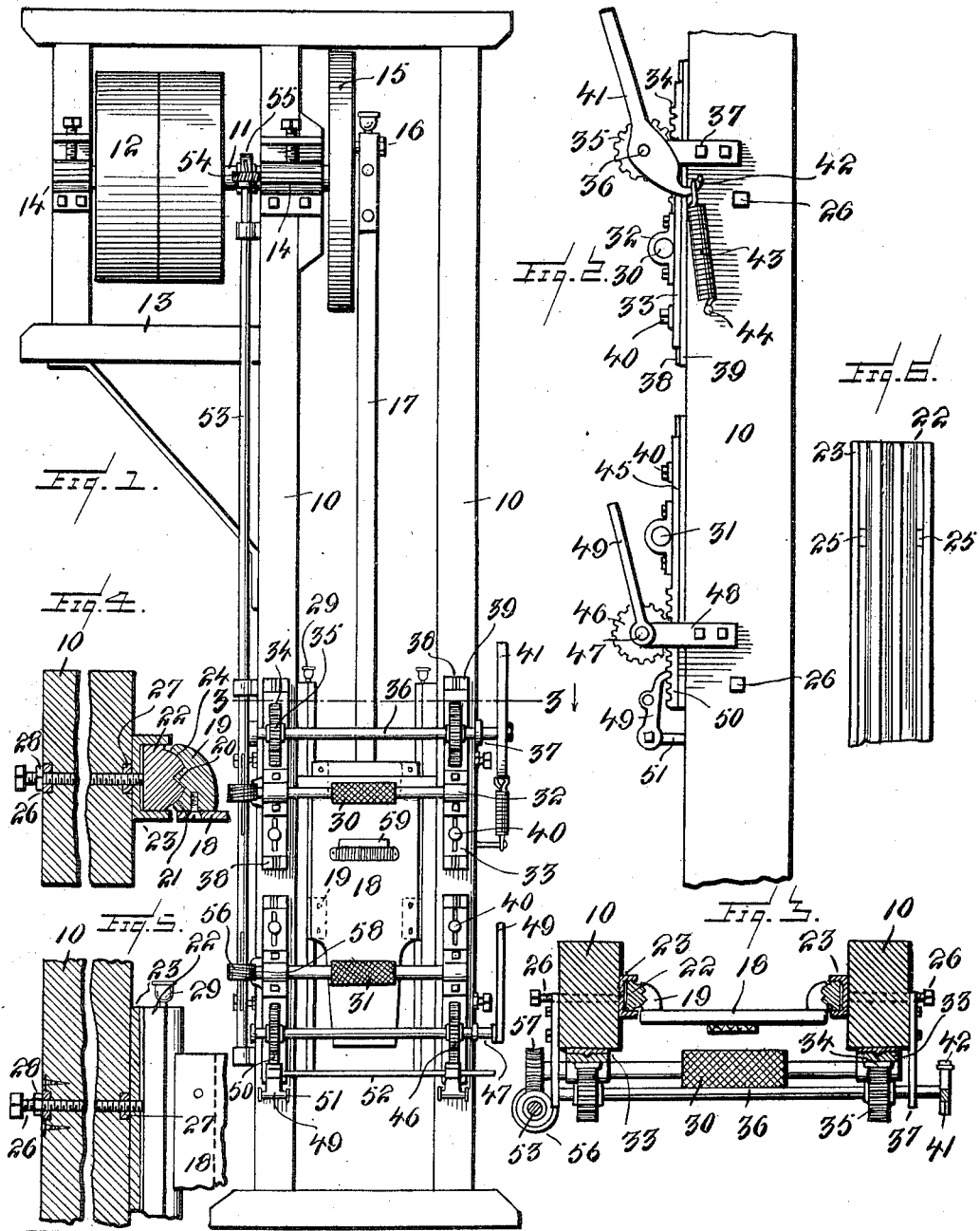
WITNESSES
INVENTOR
William S. Minor
BY
Attorney

UNITED STATES PATENT OFFICE.

WILLIAM S. MINOR, OF NORTHVILLE, NEW YORK.

EXCELSIOR-MACHINE.

998,793.  Specification of Letters Patent.  Patented July 25, 1911.

Application filed May 24, 1909. Serial No. 497,881.

*To all whom it may concern:*

Be it known that I, WILLIAM S. MINOR, citizen of the United States, residing at Northville, county of Fulton, and State of New York, have invented certain new and useful Improvements in Excelsior - Machines, of which the following is a specification, reference being had therein to the accompanying drawing.

This invention relates to a machine for making excelsior, and particularly to a structure involving a reciprocating cutter to which the block of wood is fed.

The invention has for an object to provide a novel and improved construction of the means for supporting and driving the feed rolls for the block to be cut, and also for supporting the bearings for the reciprocating cutter.

Other and further objects and advantages of the invention will be hereinafter fully set forth and the novel features thereof defined by the appended claims.

In the drawing:—Figure 1 is a front elevation of the machine; Fig. 2 is an enlarged detail side elevation; Fig. 3 is a horizontal section on the line 3—3, Fig. 1; Fig. 4 is a detail horizontal section of the bearings for the cutter; Fig. 5 is a similar vertical section; Fig. 6 is a detail elevation of the bearing block for the cutter.

Like numerals refer to like parts in the several views of the drawing.

The numeral 10 designates the standards of the machine which may be of any desired construction or configuration and are provided at their upper portion with the driving shaft 11 carrying pulleys 12 supported in a laterally extended bracket 13 by means of bearings 14 of any desired construction. This shaft is provided with a fly wheel 15 having a crank arm 16 to which the pitman 17 is pivotally connected, as shown in Fig. 1. The lower end of this pitman carries the reciprocating plate 18 upon which the cutter 59 is mounted. This plate 18 is provided at each side with a bearing block 19 secured thereto having a central angular V-shaped face 20 and a curved face 21 at the opposite sides thereof, as shown in Fig. 4. This block 19 coöperates with an adjustable block 22 which is mounted in the angular casing 23 and has a bearing face 24 formed to coöperate with the faces 20 and 21 of the block 19. For the purpose of retaining the adjustable bearing 22 against longitudinal movement in its casing 23 lugs 25 are formed on the sides of the casing and adapted to enter seats in the bearing 22, as shown in Fig. 6. For the purpose of adjusting these bearings 22 laterally a screw 26 is mounted in each standard 10 and threaded through a fixed nut 27 to contact with the rear of the bearing block 22. This screw may be locked in its adjusted position by means of the nut 28 thereon bearing against the outer face of the standard and permits an adjustment of the bearings for the cutter plate to secure the most easy and accurate operation thereof without binding of the parts. This cutter guide is provided at its upper portion with oil cups 29 by which a proper lubrication of the parts may be maintained. At the front of the cutter plate an upper feed roll 30 and a lower feed roll 31 are mounted. The upper roll is carried by bearings 32 mounted upon the rack bars or plates 33, the teeth 34 of which are adapted to mesh with a pinion 35 carried by the shaft 36, this shaft being mounted in fixed bearings 37 upon the standards, as shown in Figs. 1 and 6. The rack bars 33 are provided upon their under surface with a groove or way adapted to receive the rib 38 carried by the bearing plate 39 secured to the face of the standards 10 and is thus held against any lateral displacement and guided in its adjustment. For the purpose of limiting the travel of these rack bars a pin or projection 40 extends from the bearing plate 38 and through an elongated slot in the rack bar 33. For the purpose of adjusting the upper feed roll to permit the insertion of a block in position a hand lever 41 is secured to the shaft 36 and provided with an extension 42 from which a tension spring 43 extends to a fixed point 44 on one standard. This spring holds the upper roll 30 under yielding tension in contact with the block to be fed and automatically restores this roll to such contact immediately that the hand lever is released.

The lower feed roll 31 is adjustably mounted by means of a rack bar or plate 45 similar in construction to that just described and adapted to coöperate with a pinion 46 carried by the shaft 47 mounted in a fixed bearing 48. This shaft is also provided with a hand lever 49 by which it may be operated to adjust it relative to the coöperating upper feed roll when blocks of different sizes are to be introduced. For the purpose of holding the rack plate 45 at its adjusted position a pawl 49 is provided to engage the teeth 50 upon the rack, this pawl being pivoted upon a fixed support 51. In case pawls are used in connection with the rack on each side of the machine a connecting bar 52 may be used between them to secure simultaneous operation thereof. For the purpose of actuating or rotating the feed rolls intermittently toward each other, a vertical driving shaft 53 is provided and has at its upper end a worm gear 54 adapted to coöperate with a worm 55 secured on the shaft 11. This worm is provided with a single tooth in order to effect a very short and intermittent movement of the feed rolls from the shaft 53. This shaft is provided with the worm gears 56 slidingly splined thereon which mesh with the worm wheels 57 carried upon the shaft of the rolls 30 and 31. The worm gears 56 are moved upon the vertical feed shaft by means of embracing keepers 58 carried by the rack plates in their movement.

In the operation of the invention it will be seen that the excelsior is cut from the face of the block held between the feed rolls in the reciprocating movement of the cutter plate and in the travel of this plate in a direction opposite to its cut the block is fed forward by an intermittent motion to a sufficient extent to provide for a subsequent cut. The construction for mounting these feed rolls provides for the yielding tension of the top roll constantly against the block to be fed thus preventing slipping thereof, and in connection with the adjustment of the lower roll provides a wide range of adjustment between the rolls so as to receive blocks of different sizes. When the block is of such size as to require a greater degree of adjustment of the rolls than can be secured through the yielding contact of the upper roll, the lower roll may be shifted and its rack plate secured by the pawl so as to secure either the minimum or maximum holding capacity for the machine. The mounting of the bearings for the cutter blade and the configuration thereof provides against lost motion or vibration and also against any lateral play as they may be readily adjusted and secured in adjusted position in order to effect a positive and frictionless operation of the cutter blade. The invention therefore presents a simple, efficient and economically constructed form of excelsior cutting machine having a wide range of adjustment to receive blocks of different sizes and adapted to most efficiently feed such block toward the cutter.

Having described my invention and set forth its merits, what I claim and desire to cover by Letters Patent is:—

1. In an excelsior machine, supporting standards, a cutter plate provided with means for reciprocating the same, a bearing secured to said plate, casings mounted upon said standards, bearing blocks disposed within said casings, means for adjusting said blocks laterally of the casings, and a lug extended from said block to seat in recesses in said casing to prevent longitudinal movement of the block.

2. In an excelsior machine, supporting standards, a cutter plate mounted to reciprocate thereon, a bearing carried by said plate and provided with an oppositely inclined angular bearing face and a convex surface extending in opposite directions therefrom, and a bearing block mounted upon said standards and provided with opposite coöperating faces to engage those of said bearing.

3. In an excelsior machine, supporting standards, a cutter plate provided with means for reciprocating the same, a bearing secured to said plate, casings mounted upon said standards, a bearing block disposed within said casings, an adjusting screw threaded through said standards and bearing upon the inner face of said block for adjusting said block laterally of the casings, and a lug extended from said block to seat in recesses in said casing to prevent longitudinal movement of the block.

4. In an excelsior machine, supporting standards, a reciprocating cutter mounted thereon, rack plates slidingly mounted upon said standards, a shaft having fixed bearings upon said standards and provided with gears to engage said plate, a feed roll carried by said plate, means for rotating said roll, a lever secured to the shaft of said gears and having a hooked extension below and at the rear of its pivot, and a coiled tension spring connected to said extension and to the side of one of said supports.

In testimony whereof I affix my signature in presence of two witnesses.

WILLIAM S. MINOR.

Witnesses:
  PHILIP KECK,
  CHARLES P. SIMPKINS.

---

Copies of this patent may be obtained for five cents each, by addressing the "Commissioner of Patents, Washington, D. C."